Feb. 6, 1968   H. M. TROXELL   3,367,606
SAFETY LATCH MECHANISM
Filed June 27, 1966

INVENTOR.
HAROLD M. TROXELL
BY
ATTORNEY 12,367,606
Patented Feb. 6, 1968

3,367,606
SAFETY LATCH MECHANISM
Harold M. Troxell, Burlington, N.J., assignor to the United States of America as represented by the Secretary of the Navy
Filed June 27, 1966, Ser. No. 561,660
8 Claims. (Cl. 244—3)

The invention described herein may be manufactured and used by or for the Government of the United States of America for governmental purposes without the payment of any royalties thereon or therefor.

The present invention relates to launchers for retaining a towed vehicle in a fixed stowed position in a towing aircraft or streaming the vehicle at a distance from the towing aircraft by a length of towing cable, and more particularly to an emergency latch mechanism for operation in the event of accidental release by such a launcher while the towed vehicle is in the fixed stowed position.

Aircraft on missions such as aircraft gunnery and magnetic anomaly detection utilize cable-towed vehicles for targets or for carrying detection equipment. The vehicle is carried by a launcher which is supported underneath or alongside the towing aircraft and which is operable to pay out or retrieve the vehicle. While the vehicle is carried in the stowed position in launchers of the prior art there is danger of a malfunction in the launcher, such as a cable break or primary latch failure, which will cause undesirable release of the vehicle.

Many attempts have been made to design a reliable launcher to prevent accidental release of the vehicle from its stowed position, but have usually resulted in heavier or more expensive materials for strength, or in more complicated and expensive designs.

It is the general purpose of the present invention to provide an emergency safety latch mechanism in the launcher for providing positive securement of the towed vehicle in the stowed position so that, in the event of a broken cable or other mechanical or electrical failure, the towed vehicle would not be accidentally released from the launcher. This is accomplished by two pairs of opposed pivotal arms in the launcher which normally obstruct a crossbar on the vehicle-connected end of the tow cable from accidentally moving downward and out of the launcher, but permit it to pass upward into the launcher during retrieval of the cable. A motor actuator pivots one of the pairs of arms away from the obstructing position when it is desired to release the vehicle from the launcher and pay out the tow cable.

Accordingly, it is an object of the present invention to provide a novel emergency safety latch mechanism in an airborne launcher for preventing inadvertent release of a towed vehicle from its stowed position in the launcher.

Another object of the invention is to provide a novel emergency safety latch mechanism for use with the primary vehicle securing means in a launcher.

Still another object of the invention is to provide a relatively simple and inexpensive emergency safety latch mechanism which employs relatively few parts, which is reliable and rugged, and which is adaptable to many types of launchers and securing means.

Various other objects and advantages will appear from the following description of one embodiment of the invention, and the most novel features will be particularly pointed out hereinafter in connection with the appended claims.

Figure 1:
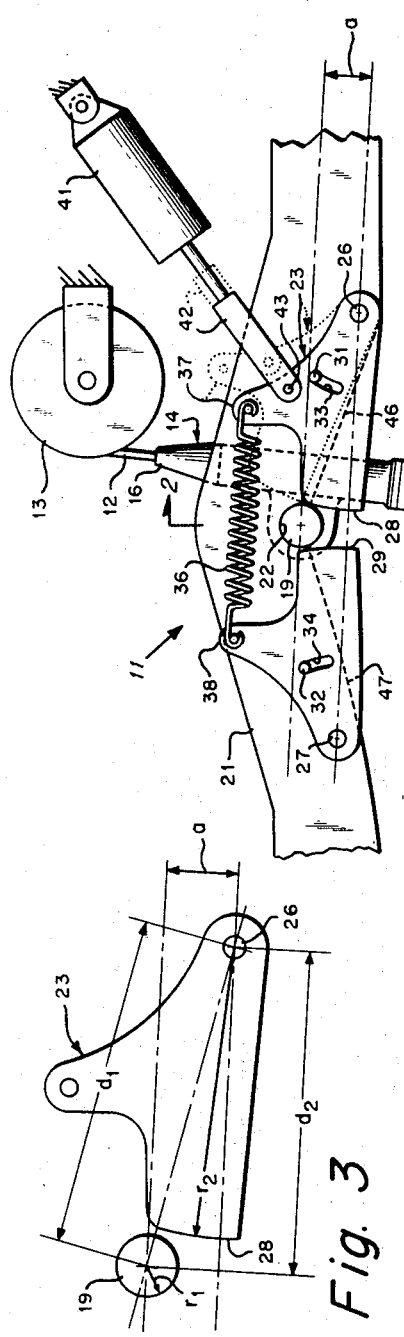
FIG. 1 represents a fragmentary side view of an emergency safety latch mechanism of the present invention installed in a typical launcher with a towed vehicle secured therein.
Figure 2:
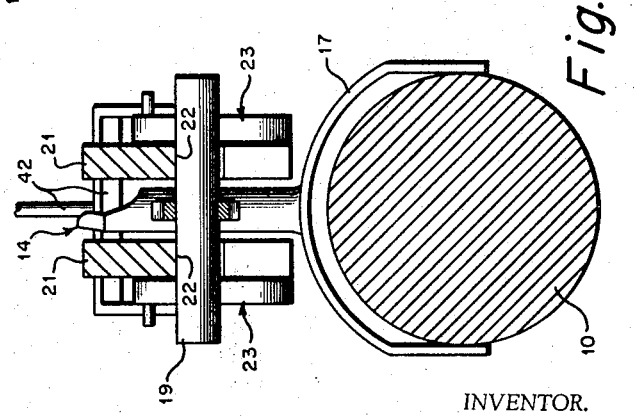
FIG. 2 represents a cross sectional view of the embodiment of FIG. 1 taken along the line 2—2 thereof.

Referring now to FIGURES 1 and 2, a fragment intermediate the ends of a towed vehicle 10 is shown in the secured or stowed position in an airborne launcher having parts essential to this disclosure indicated generally by the numeral 11. The vehicle 10 is streamed and retrieved on a cable 12 by a motorized reel or winch 13 controlled from the towing airplane, to which the launcher 11 is mounted, in any convenient manner. The free end of the tow cable 12 is connected through a coupling, indicated generally by the numeral 14, to the vehicle 10. The coupling 14 has a cylindrical end 16 which is tapered toward the end and is fixed to the cable 12. The coupling 14 is bifurcated at the other end into arms 17 which straddle the sides of the vehicle 10 and are pivotally connected thereto at their ends by pins 18. Positioned intermediate the ends of the coupling 14 and fixed thereto is an elongated crossbar 19 of circular cross section having a radius $r_1$, extending from both sides of the coupling 14 in lateral direction relative to the longitudinal axis of the towed vehicle 10.

In the stowed position shown in FIG. 1, such as when tension is applied to the cable 12 by the reel 13, the crossbar 19 is urged upward into contiguous contact with a pair of arcuate grooves 22, also of radius $r_1$ with one in each of a pair of parallel members 21, the latter being fixed in the launcher 11 and forming a structural part thereof. The members 21 are generally oriented at the launcher opening parallel to the aircraft longitudinal axis at the launcher 11. The radial grooves 22 are coaxially positioned with their common center line normal to the length of the members 21.

Figure 3:
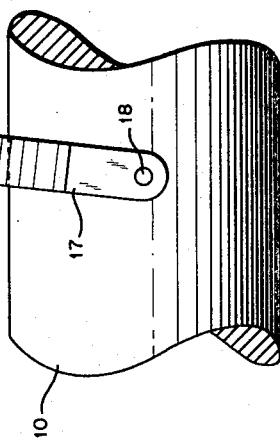
FIG. 3 is an enlarged view of a crossbar and keeper appearing in the embodiment of FIG. 1.

Each member 21 pivotally supports a pair of opposed keepers identified as fore and aft keepers 23 and 24 by means of pins 26 and 27, respectively. Being identical in operation, the keepers 23 and 24 will be described hereinbelow with reference only to the pair shown in FIG. 1. The center positions of the pins 26 and 27 are displaced below the radial center of the groove 22 a distance $a$ which is measured perpendicularly from a line drawn between the centers of the pins 26 and 27 to the center of the radial groove 22. Confronting ends 28 and 29 of the keepers 23 and 24 are arcuately curved at their ends to a radius $r_2$ about the pivotal points of the keepers 23 and 24. As best seen in FIG. 3, the distance $d_1$ between centers of the arcuate groove 22 and the pin 26 is sufficiently greater than the sum of the radii $r_1$ and $r_2$ in order to avoid contact between the ends 28 and the crossbar 19 when the latter is fully seated in the groove 22. However, the sum of $r_1$ and $r_2$ is greater than one-half the distance between the pivotal centers of pins 26 and 27. This dimensional relationship of keeper 23, also applicable to keeper 24, is to insure that the keepers 23 and 24 are free to rotate about pins 26 and 27 when the crossbar 19 is completely in the groove 22, but that the crossbar 19 will become wedged between the ends 28 and 29 if the launcher accidentally releases the vehicle 10. The rotation of the keepers 23 and 24 is limited between a closed position, shown in FIG. 1 in solid outline, and the open position, also shown in FIG. 1 but in dotted outline, by studs 31 and 32 laterally extending from and affixed to the member 21. The studs 31 and 32 register in arcuate apertures 33 and 34 of radii about the centers of pins 26 and 27. In the closed position, the ends 28 and 29 of keepers 23 and 24 obstruct the crossbar 19 from passing downward therebetween; whereas, in the open position downward motion of crossbar 19 between the ends 28 and 29 is unobstructed. A coil spring 36 connected in tension at the ends of laterally extending arms 37 and 38 of keepers 23 and 24 urge the latter to the closed position.

A relatively small motor actuator 41 pivotally secured in the launcher 11 has a reciprocable actuating plunger 42 pivotally connected at the outer end to the keeper 23 by a pin 43 in the arm 37. The plunger 42 is normally in the extended position when actuator 41 is de-energized. When it is desired to pay out the tow cable 12 and stream the vehicle 10, actuator 41 is energized to retract the plunger 42 and rotate the keeper 23 against the force of the spring 36 to the open position. When the reel 13 is operated for cable payout, the crossbar 19 can then pass through the enlarged opening formed between the keepers 23 and 24.

Figure 4:
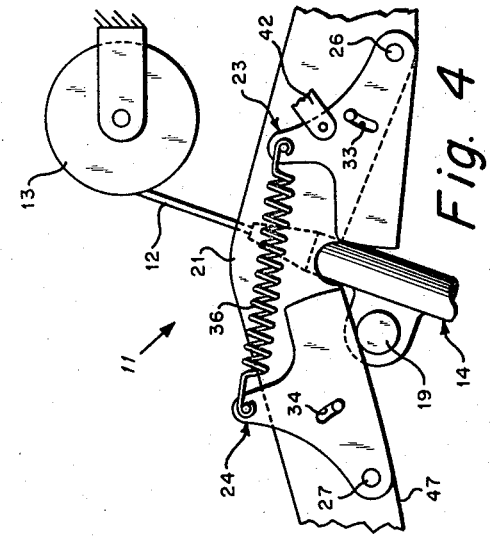
FIG. 4 represents another fragmentary side view of the embodiment of FIG. 1 except with the towed vehicle in a retrieving position about to be secured in the launcher.

Lower surfaces 46 and 47 of structural members 21 are recessed about the grooves 22 and slope upward from fore and aft points beneath the pivot pins 26 and 27 forming thereby shallow V-notches with the grooves 22 at the apexes. Referring to FIG. 4, in which the coupling 14 is being retrieved into the launcher 11 by cable 12 and reel 13, the crossbar 19 is urged against the surface 47 due to an upward force of the cable 12 and the drag on the vehicle 10. This force rotates the keeper 24 to the open position (counterclockwise as shown in FIG. 4) against the force of spring 36. When crossbar 19 passes the end 29 of keeper 24, spring 36 urges the keeper 24 back to the closed position (clockwise as shown in FIG. 4).

A failure of the motorized reel 13 to maintain cable tension, rupture of the cable 12, or failure of any primary latching device on the coupling 14, while the vehicle 10 is stowed in the launcher 10, will not result in accidental release of the vehicle 10. The crossbar 19 will drop slightly due to the weight of the vehicle 10 until it wedges between the ends 28 and 29 of the keepers 23 and 24. It is contemplated that the maximum available retracting force of motor 41 be limited so that the keeper 23 cannot be accidentally rotated to the open position while crossbar 19 is wedged between the ends 28 and 29.

From the foregoing description of one embodiment of the invention, some of the many attendant advantages and improvements should now be apparent. For example, the emergency safety latch mechanism of the invention is easily adaptable to many different types of launchers and primary securing mechanisms. It has only a few moving parts, namely the crossbar 19, the keepers 23 and 24 and the motor 41. It is relatively inexpensive to manufacture, install and maintain. The latch mechanism does not lock the vehicle 10 in the stowed position under normal operation, hence, its elements are not under continuous stress to produce fatigue. This also permits the use of the lightweight actuating motor 41.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a launcher for securing and towing a vehicle by a cable means from an aircraft, a safety latch mechanism comprising:

crossbar means formed to be fixed to the cable means adjacent to the vehicle in a position normal to the length of the vehicle;

elongated support means rigidly connected at the opening of the launcher and forming an integral part thereof;

a pair of opposed elongated keepers each pivotally connected to said support member and having arcuate surfaces at the free ends thereof for registering with said crossbar means;

stop means connected between said support member and said keepers for limiting rotation of said keepers; and force exerting means operatively connected between said keepers for urging the latter to a closed position.

2. A mechanism according to claim 1 wherein said crossbar means further comprises:

a cylindrical member having a selected cross sectional radius $r_1$.

3. A mechanism according to claim 2 wherein said support means further comprises:

a lower surface on said support means having formed therein a recess of sides sloping equally toward each other to an arcuate groove of the radius $r_1$ about a center midway between the outer ends of said recess for receiving said crossbar means.

4. A mechanism according to claim 3 wherein each of said keepers further comprises:

means pivotally connecting said keeper adjacent to the outer ends of the recess, the free end of each said keepers in a closed position having a confronting arcuate surface of a selected radius $r_2$ about the pivotal connection, the relation of $r_1$ and $r_2$ with respect to the centers of the arcuate groove and pivotal connections being as follows:

$r_2$ is less than $d-r_1$, and
$r_2$ is greater than $d_2-r_1$, where $d_1$=the distance between centers of the arcuate groove and each of said pivotal connections, and $d_2$=one-half the distance between said pivotal connections.

5. A mechanism according to claim 4 wherein said stop means further comprises:

means for limiting the rotation of said keepers in closed position.

6. A mechanism according to claim 5 wherein said force exerting means further comprises:

means for urging the latter against said stop means.

7. A mechanism according to claim 6 further comprising:

actuator means in said launcher operatively connected to one of said keepers for rotating the latter to an open position against the force of said force exerting means.

8. In a launcher for securing and towing a vehicle by a cable means from an aircraft, a safety latch mechanism comprising:

cylindrical crossbar means formed to be fixed to the cable means adjacent to the vehicle in a position normal to the length of the vehicle, said crossbar means having a selected cross sectional radius $r_1$;

elongated support means rigidly connected at the opening of the launcher and forming an integral part thereof, the lower surface of said support means having formed therein a recess of sides sloping equally toward each other to an arcuate groove of the radius $r_1$ about a center midway between the outer ends of said recess for receiving said crossbar means;

a pair of opposed elongated keepers each pivotally connected to said support member adjacent to the outer ends of the recess, the free end of each of said keepers in a closed position having a confronting arcuate surface of radius $r_2$ about the pivotal connection, the relationship of $r_1$ and $r_2$ with respect to the centers of the arcuate groove and pivotal connections being as follows:

$r_1$ is less than $d_1-r_1$, and
$r_2$ is greater than $d_2-r_1$, where $d_1$=the distance between centers of the arcuate groove and each of said pivotal connections, and $d_2$=one-half the distance between said pivotal connections;

stop means connected between said support member and said keepers for limiting rotation of said keepers in the closed position;

force exerting means operatively connected between said keepers for urging the latter against said stop means; and actuator means in said launcher operatively connected to one of said keepers for rotating the latter to an open position against the force of said force exerting means.

References Cited

UNITED STATES PATENTS 1,166,035  12/1915  Arndt _____ 212—105
3,100,093  8/1963  McQuillen et al. _____ 244—3

MILTON BUCHLER, *Primary Examiner.*

P. E. SAUBERER, *Assistant Examiner.*